Sept. 1, 1959            G. T. LEE            2,901,847
DISPLAY APPARATUS
Filed June 6, 1957                      2 Sheets-Sheet 1
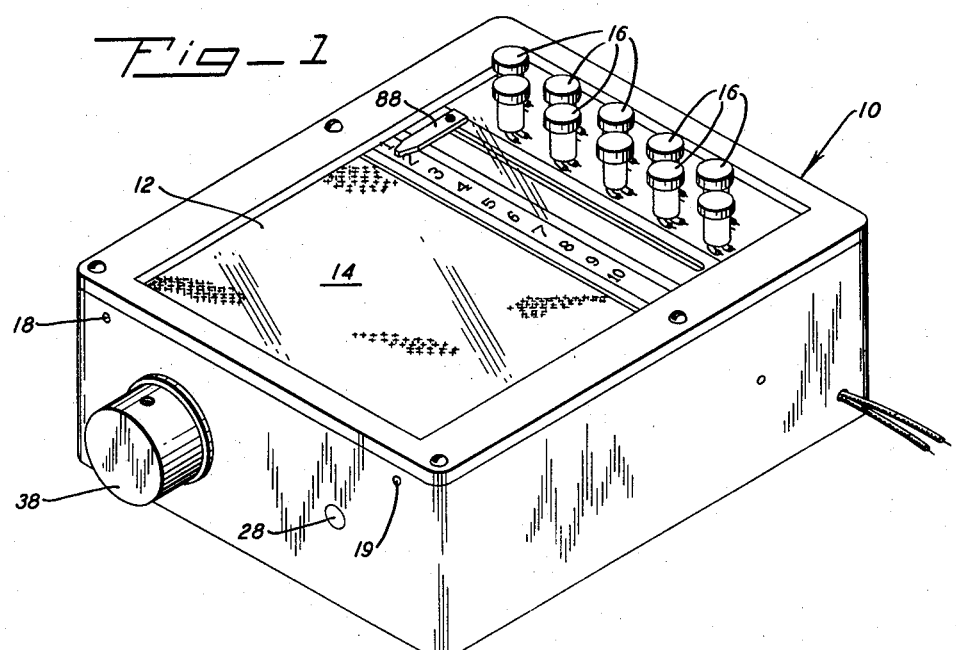
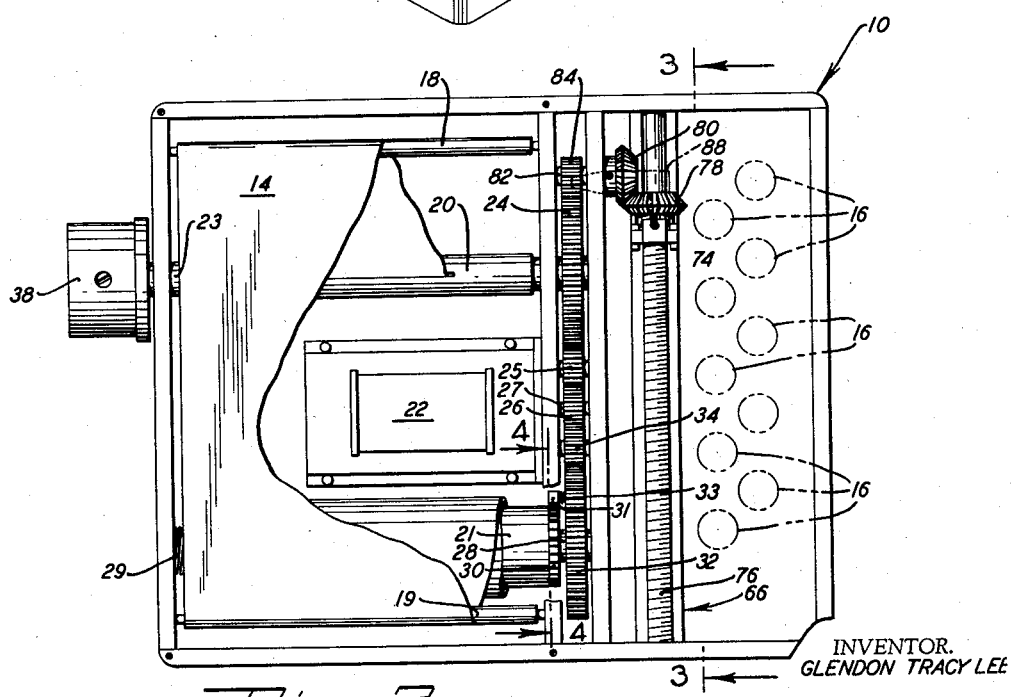
INVENTOR.
GLENDON TRACY LEE
BY
*Paul B. Fike*
PATENT AGENT

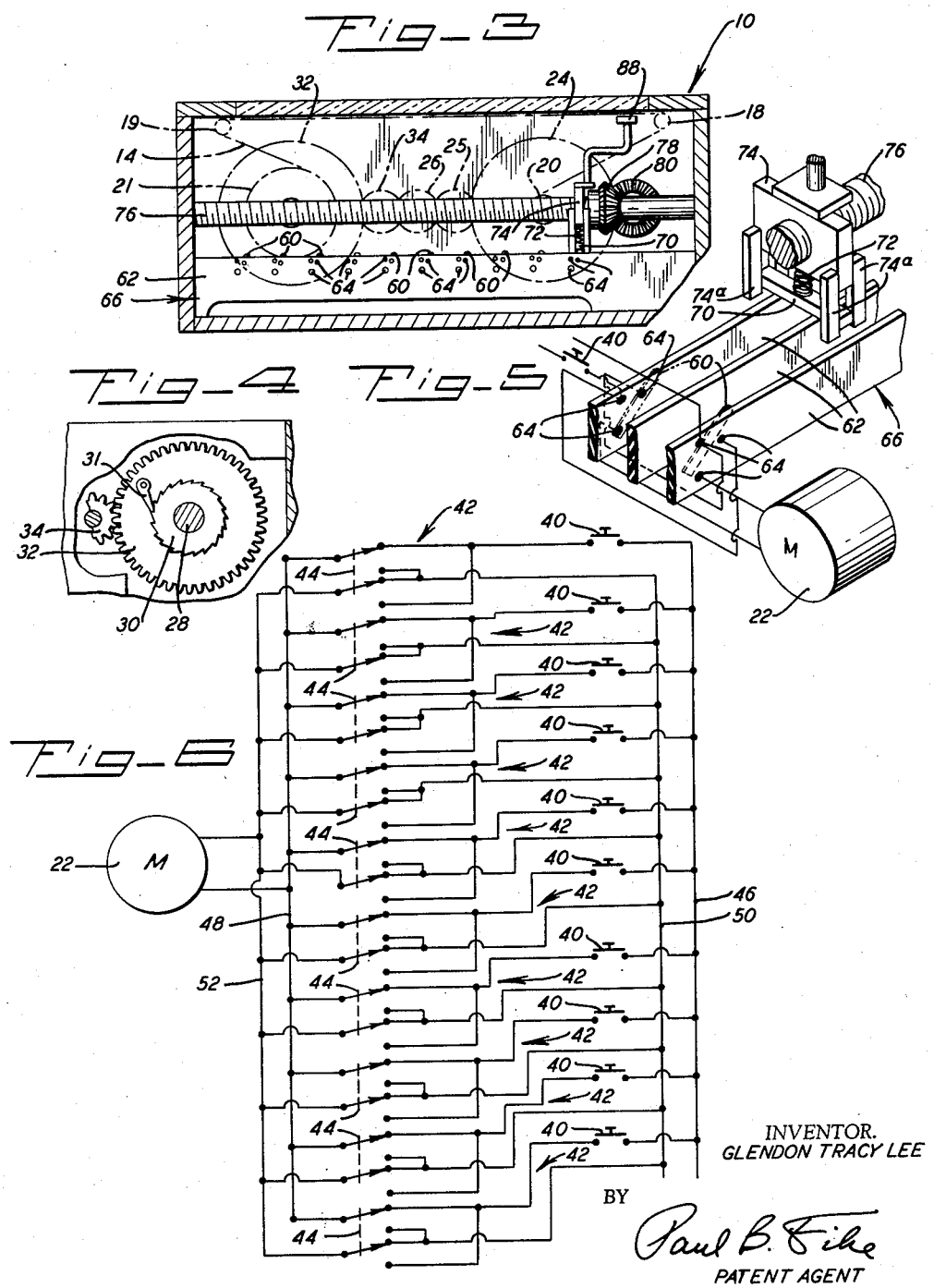

United States Patent Office 2,901,847
Patented Sept. 1, 1959

2,901,847
DISPLAY APPARATUS
Glendon Tracy Lee, Los Altos, Calif.
Application June 6, 1957, Serial No. 663,996
4 Claims. (Cl. 40—31)

The present invention relates generally to display apparatus and more particularly to apparatus arranged to present for display a preselected portion of a belt having print or other intelligence material thereon.

In many instances, it is desirable, in fact, almost essential that a certain part of printed material, voluminous in its entirety, be brought quickly and surley into position for visual inspection. One example would be an individual entry in an extensive credit record list. Another, to which the present invention directly though not exclusively pertains, is the portion of an aircraft emergency procedure list pertinent to a particular emergency situation. Since a relatively large number of emergencies can arise during aircraft operation, and each emergency necessitates that a rather detailed procedure be followed, particularly if the aircraft is a large complex one, an extensive procedure list is often required and is quite frequently printed on an elongated belt which may reach 10 or more feet in length. As a consequence manual rolling or unrolling of the belt to provide visual access to that portion pertinent to a given emergency situation might well be so time-consuming as to render the list practically useless. Obviously, procedures in an emergency must be carried out expeditiously and even a relatively short delay cannot be tolerated when the safety of an airplane, its cargo and particularly its passengers is at stake.

It is a general object of the present invention, therefore, to provide apparatus for rapidly and automatically presenting a portion of the printed material on an elongated belt for visual inspection.

It is a particular feature of the invention to provide such an apparatus having minimum space and weight characteristics whereby it is especially adapted for aircraft installation.

Another feature relates to the belt drive arrangement which automatically instigates rapid motion of the belt in the appropriate direction to bring a desired portion thereof quickly into view, and additionally, programs or presets such drive arrangement to the appropriate directivity for movement of the belt to a subsequent position.

A further feature relating to the belt-drive arrangement is the provision of a single, simple, direct current reversible motor as the prime mover therefor.

Yet an additional feature relating to the belt drive arrangement is the simple yet effective manner for presetting the electrical connections for such motor to achieve the electrical polarity appropriate to the desired direction of belt motion.

In accordance with one aspect of the invention, it is a feature to provide for the instigation of belt movement in direct response to an electrical impulse such as produced by the electrical warning system in an airplane.

Another feature relates to the arrangement for winding the belt from one supporting roller to another in a manner such that accommodation for the change in diameter as the winding proceeds is simply yet effectively afforded.

These and other objects and features of the invention will become more apparent from a persual of the following description of a preferred embodiment of the invention illustrated in the accompanying drawings, wherein:

Fig. 1 is a perspective view of a display apparatus constituting such preferred embodiment of the invention, Fig. 2 is a top plan view of the apparatus illustrated in Fig. 1 with portions broken away to illustrate interior details thereof, Fig. 3 is a sectional view taken substantially along line 3—3 of Fig. 2 illustrating certain other details of its interior structure, Fig. 4 is a fragmentary sectional view taken along line 4—4 of Fig. 2, Fig. 5 is an exploded perspective view illustrating the elements of a switch control arrangement constituting one part of the mechanism, and Fig. 6 is a schematic diagram of the electrical circuit associated with the disclosed structure.

With initial reference to Fig. 1, the entire device is housed within a generally rectangular box or case 10 that has a transparent window 12 therein through which a portion of a paper or cloth belt 14 having printed material thereon can be viewed. Generally, such belt 14 is arranged for movement within the case 10 so that different portions thereof can be persented for visual inspection through the described window 12. Correlated with respective portions of the belt 14 are a series of push buttons 16 positioned on the case to one side of the window. By means of electrical and mechanical structure to be described hereinafter, the depression of one push button will bring the correlated portion of the belt 14 into view through the window 12.

The case 10, as illustrated, has lateral dimensions approximately 6 inches by 6 inches in order to support therewithin a belt 14 having a lateral dimension of approximately 3 inches and a length which may exceed 10 feet. Quite obviously, the belt 14 may be of any other desired size for particular application and an appropriately dimensioned case can be designed to provide for accommodation thereof. However, regardless of the selected belt dimensions, it will be seen that a relatively small case can be arranged to house the same yet to present for view any selected portion thereof through the window. It will be apparent that the maintenance of small dimensions for the entire apparatus is important and almost imperative for installation in the cockpit of an aircraft where space is, of necessity, at a premium.

With particular reference now to Figs. 2 and 3, the belt 14 is trained about small bars 18, 19, disposed transversely within the case 10 at opposite sides of the described window 12, and then passes downwardly and around rollers 20, 21 to which the belt 14 is attached at its opposite ends, respectively. Thus, it will be seen that the portion of the belt disposed between the two bars 18, 19 will lie in flat, planar relationship immediately under the window 12 and rotation of the rollers 20, 21 will effect belt movement so that different portions of the belt 14 can be exposed for visual inspection through the window 12.

In order to effect such belt movement, that is winding onto one roller while unwinding from the other roller simultaneously occurs, a reversible, direct current motor 22 is positioned underneath the belt 14 between the two rollers 20, 21, and drive connection is established between this motor and both of the rollers. More particularly, the upper roller 20 which is of relatively small diameter, is fixed on a shaft 23 mounted for rotation in the case 10 and carrying a relatively large gear 24 at its extremity. This large gear 24 meshes with a small gear 25 which, in turn, meshes with a second small gear 26 fixed at the end of the shaft 27 of the motor 22. Thus, a positive drive connection is established between the motor 22 and the roller 20; and rotation of the motor shaft 27 in either direction will result in rotation of the roller 20 in a fashion such that a positive correlation of motion is maintained therebetween. The second, or lower roller 21, as viewed in Fig. 2, is mounted on a shaft 28 for free rotation thereon and for axial sliding movement therealong. A coil spring 29 is disposed between the end of the roller 21 and the side of the case 10 so as to constantly urge the roller to the right, as viewed in Fig. 2, wherefore the right hand end thereof is urged into frictional clutching engagement with the side of a ratchet wheel 30 that is fixed on the shaft 28. With reference to Fig. 4, in addition to Fig. 2, a pawl 31 is mounted on one side of a large gear 32 mounted for free rotation on the shaft 28 immediately adjacent the ratchet wheel 30, and a coil spring 33 urges the pawl constantly into engagement with the teeth of the ratchet wheel 30. Drive connection is established between the motor 22 and the large gear 32 by a small gear 33 that meshes both with the large gear 32 and the small gear 26 on the motor shaft 27. Thus, it will be seen that if the motor 22 is energized so as to drive the large gear 32 in a counterclockwise direction, as viewed in Fig. 4, the ratchet wheel 30 will be driven through engagement by the pawl 31; but if the motor 22 is energized to rotate in the other direction, the pawl 31 merely rides over the rear face of the teeth of the ratchet wheel 30 and no driving connection is made therewith. When the large gear 32 and the ratchet wheel 30 are driven in a counterclockwise direction, as viewed in Fig. 4, the roller 21 is driven in the same direction through its frictional engagement with the side of the ratchet wheel 30, but since this is a mere frictional connection, slippage between the ratchet wheel 30 and the roller 21 is, of course, enabled.

As clearly shown in Fig. 2, this second or lower roller 21 is somewhat larger than the upper roller 20 and the ratio of their diameters is such that when the belt 14 is fully wound on the upper roller 20, the diameter of the rolled belt thereon is substantially the same as the diameter of the lower roller 21. This ratio of diameters of the rollers 20, 21 and the described drive arrangement therefor eliminates the difficulties that normally arise in connection with the change in diameter of a belt as it is wound or unwound from one roller onto another.

As shown in Fig. 2, the belt 14 is almost entirely wound upon the lower roller 21 and the terminus of the belt 14 on the upper roller 20 can be seen. From this position, appropriate rotation of the motor 22 will effect winding of the belt 14 onto the upper roller 20 while unwinding occurs from the lower roller 21, since throughout the entire movement of the belt 14 from the lower roller 21 to the upper roller 20, the effective diameter of the lower roller 21 with the belt thereon is always greater than the effective diameter of the rolled belt on the upper roller 20; this upper roller 20 must always rotate at a speed greater than that of the lower roller 21. As a consequence, the lower roller 21 and the ratchet wheel 30 in frictional engagement therewith will be rotating in a clockwise direction, as viewed in Fig. 4, at a speed slower than the rotative speed of the large gear 32 and the pawl 31 thereon, wherefore the pawl 31 merely rides in a clockwise direction over the rear face of the ratchet teeth and no drive connection is established therebetween. In short, during the winding of the belt 14 from the lower roller 21 onto the upper roller 20, as viewed in Fig. 2, a positive drive is operating the upper roller 20 in its rotation while the lower roller 21 is merely freed to turn at a speed sufficient to permit the necessary unwinding of the belt 14 therefrom.

If, subsequently, after the belt 14 has been entirely wound on the upper roller 20, and it is desired to return it to the lower roller 21, rotation of the motor 22 in the opposite direction will effect rotation of the lower roller 21 in a direction to wind the belt 14 thereon through the establishment of driving relationship between the pawl 31 and the ratchet wheel 30 and also the frictional driving connection between the side of the ratchet wheel 30 and the roller 21. However, again, since the lower roller 21 with the belt thereon is always of greater diameter than the upper roller 20, however much of the belt remains thereon, the lower roller 20 must rotate at a lesser speed than the upper roller 20, and such lessening of its speed is accommodated through the described frictional engagement between the ratchet wheel 30 and the end of the roller 21. Thus, if the large gear 32 and the ratchet wheel 30 driven through its engagement by the pawl 31 are assumed to rotate one revolution, but the lower roller 21 can rotate somewhat less than one revolution through slippage between the end thereof and the ratchet wheel 30. Ultimately, then it can be seen that regardless of the direction of rotation of the rollers 20, 21, and accordingly, the direction of belt movement, the disposition of the belt 14 is positively controlled by the positive drive connection to the upper roller 20 while the change in diameter of the rollers with the belt wound thereon is accommodated by the ratchet and clutch mechanisms connecting the lower roller 21 to the motor 22, and, in addition, by the chosen diameter ratio of the two rollers 20, 21.

The described motor 22 is fed by direct current from a 27 volt direct current source which is available on substantially all commercial aircraft, but other motors can obviously be substituted therefor, as long as a relatively small space is required for their containment. The ratio of the gears while not critical, is chosen so that relatively rapid turning of the rollers 20, 21 is provided wherefore the entire length of the 10 foot belt can be moved from a fully wound position on one roller to a fully wound position on the other roller in a time somewhere in the neighborhood of 3 seconds. Thus, any portion of the belt 14 can be brought into position for visual inspection beneath the window 12 in a very short period of time. Minor adjustment of the belt position can at any time be made by manual rotation of a knob 38 attached to the end of the upper shaft 22.

Each of the described push buttons 16 on the case 10 are arranged to close a switch 40 in one of a group of parallel circuits 42, each of which connects the 27 volt power source to the described motor 22. Each push button 16 and the associated switch 40 are correlated with a predetermined setting of the belt 14 so that upon the depression of any particular push button 16, the belt 14 will be brought to that desired correlated setting regardless of the previous position of the belt. Thus, it will be apparent that, in some instances, the motor 22 will have to rotate in one direction in order to bring the belt 14 to the desired position while, in another case, the belt will be in such a position that the motor 22 must rotate in a reverse direction in order that the belt 14 may be brought to that same position.

In order to provide for the proper presetting or programming of the direction of the belt movement, a polarity switch 44 is associated with each of the described push button switches 40. As shown in the circuit diagram in Fig. 6, each of such polarity switches 40 is a double-pole switch that is arranged when thrown to reverse the polarity of the connections to the direct current motor 22. More particularly, if a polarity switch 44 is in its upper position, as shown in Fig. 6, the lead 46 to the positive side of the power source, is connected through the push button switch 40 and one portion of the polarity switch 44 to one motor lead 48 while the lead 50 from the negative side of the source is connected through the other portion of the polarity switch 44 to the second motor lead 52. Throwing the polarity switch 44 reverses these connections.

In order to preset each of the polarity switches 44 to the desired position, an arrangement is provided for effecting the throwing of the polarity switches successively as the motor 22 rotates to change the position of the belt 14 on the rollers 20, 21. As illustrated in Figs. 3 and 5, the switch arms 60 of each polarity switch 44 are mounted on suitable insulating panels 62 in substantial alignment. The switch terminals 64 are also physically mounted in these insulating panels 62 so that upon movement of the switch arms 60 appropriate connection is made between the terminals. The insulating panels 62 are assembled in a suitable manner and form an elongated rectangular block, as indicated at 66 in Fig. 3, with the free ends of the switch arms 60 projecting above such block 66 for switching engagement by an actuating arm 70 that is arranged to move longitudinally thereof when the motor 22 is energized. Such actuating bar 70 is urged downwardly against the insulating block 66 by a compressed spring 72 which serves to also mount the actuating bar on a carriage 74. The carriage 74 is centrally apertured and threaded for engagement with a lead screw 76 upon which it is supported and along which it will move when the lead screw is rotated. In order to preclude rotation of the carriage itself when the lead screw 76 turns, guide elements 74a project downwardly from each side of the carriage 74 on opposite sides of the actuating bar 70 to engage the edge of the insulating block 66. One end of the lead screw 76 is provided with a bevel gear 78 arranged for meshing engagement with a bevel gear 80 at one end of a stub shaft 82. The other end of this shaft 82 carries a small gear 84 in mesh with the described large gear on the upper roller shaft 23 (see Fig. 2). Thus a positive drive connection is made between the motor 22 and the carriage 74 which supports the switch actuating bar 70.

When the motor 22 is energized to turn the belt rollers 20, 21 in one direction, the lead screw 76 will turn to effect movement of the carriage 74 longitudinally of the block 66 bringing the actuating bar 70 successively into engagement with the free ends of the switch arms 60 to thereby successively throw them from one polarity position to the other. If the motor 22 rotates in the other direction, obviously, the switch arms 60 engaged by the actuating bar 70 will then be thrown to the opposite polarity position. If the switch arms 60 are thrown by the actuating bar 70 as it moves upwardly along the insulating block 66, as viewed in Fig. 2, the switches 44 will be thrown upwardly to establish a polarity position such that if any push button 16 is subsequently engaged which is associated with one of these polarity switches 44 that has been moved upwardly, then the motor 22 will be caused to rotate in a manner to move the belt 14 towards the upper roller 20 and the actuating bar 70 will be caused to move downwardly along the insulating block 66 until it arrives at the position of such polarity switch thereon. In order to indicate visually the instantaneous position of the carriage 74 and thus the belt 14, numbered indicia provided on the case 10 as seen in Fig. 1, each number being associated with the adjacent push button 16, and a pointer 88 carried by the carriage 74 moves adjacent thereto.

As shown in Fig. 1, the pointer 88 is directed toward "1" of the above-described indicia which means that the belt is in its fully wound position on the lower roller 21 and the carriage 74 is at the upper end of the lead screw 76, as viewed in Fig. 2. Such a disposition of the parts is that associated with the depression of the first or uppermost push button 16 and, as shown in the circuit diagram of Fig. 6, all of the polarity switches 44 will be in their upper positions. With the parts in the described and illustrated positions, a depression of, for example, the fifth push button will result in the following action. The motor 22 will be energized through the circuit associated with the pressed push button 16 so as to revolve in a direction wherein winding from the lower roller 21 to the upper roller 20 will be instigated. Simultaneously with such winding of the belt from the lower to the upper roller, the carriage 74 on the lead screw 76 will be caused to move downwardly as viewed in Fig. 2, or to the left, as viewed in Fig. 3, and during its movement the actuator bar 70 carried by the carriage 74 will, in successive order, throw the polarity switches 44 from their upper positions, as viewed in Fig. 5, to their lower positions, thereby reversing the polarity of those switches 44 that are associated with the push buttons in ascending numerical order. When the appropriate position, as indicated by the pointer 88 coming adjacent "5," is reached, the push button 16 may be released whereupon the motion of the belt 14 and the carriage 74 will be stopped and the material on the portion of the belt corresponding to the fifth button 16 will now be available for visual inspection. During such inspection, the operator may make small adjustments in the belt position by turning of the described manual knob 38.

After this described operation has been completed, it will be seen that the polarity switches 44 associated with the first four push buttons will be in their downward position, as viewed in the circuit diagram of Fig. 6, while those in the fifth through the tenth positions will remain in their upper position, as illustrated. As a consequence, if subsequent motion to a portion of the belt associated with any of the lower numbered buttons is required, a depression of any one of these buttons will effect energization of the motor 22 so as to effect a reverse rotation thereof from that described above. Therefore, the belt 14 and the carriage 74 will move in the opposite directions from those described above, the belt 14 moving from the upper roller 20 onto the lower roller 21, as viewed in Fig. 2, and the carriage 74 moving from a central position on the lead screw 76 to one nearer the top thereof, also as viewed in Fig. 2. During such movement, say, to the position corresponding to the second push button 16, the polarity switches 44 associated with the third and fourth push buttons will be again reversed to reassume their upper disposition, as illustrated in Fig. 6. The first and second polarity switches 44 associated with the first two push buttons will remain in their lowered position, however. Thus, it will be seen that during any movement of the belt, the polarity switches 44 are automatically preset so that subsequent depression of any push button 16 will cause the motor to rotate in the direction which is appropriate to bring the required portion of the belt 14 into view through the window 12 in the case 10.

Various additions, modifications and alterations can obviously be made to the described structure. As one obvious example, a substitution can be made for the described manual push buttons 16. In place of these buttons, a direct connection can be made to the alarm system in an airplane; for example, the excitation of a danger lamp or buzzer, upon the occurrence of, for example, a fuselage fire in a commercial aircraft. The same electrical energy which effects lighting of the lamp or buzzing of the buzzer can be employed to supply current to energize a conventional relay which would in turn close a switch corresponding to one of the push button switches 40 illustrated in Fig. 6. With such direct connections from the aircraft alarm system to the energization circuit for the motor 22, the operation is rendered completely automatic.

Yet other modifications and alterations can obviously be made without departing from the spirit of the invention. Consequently, the foregoing description of a preferred embodiment thereof is to be considered as purely exemplary and not in a limiting sense. For indication

What is claimed is:

1. Apparatus for displaying a portion of an elongated belt which comprises a case having a central window therein, a pair of rollers mounted for rotation within said case on opposite sides of said central window and adapted to support the belt for movement from wound relation on one roller to the other whereby the portion of the belt intermediate said rollers is visible through said window and such visible portion can be varied, a reversible direct current motor disposed under the belt between said rollers, means connecting said motor to both of said rollers in a manner such that energization of said motor in one direction will effect belt-winding rotation of one of said rollers while the other of said rollers will turn in belt-unwinding rotation, a plurality of polarity switches electrically connected in parallel to said motor, each including a switch arm movable between reversed polarity positions, said switch arms being supported in aligned relation adjacent said motor in said casing, a source of direct current power, and a plurality of main switches, each associated with one of said polarity switches for connecting said source to said motor, and an actuator bar operatively connected to said motor and arranged for movement into successive engagement with said polarity switch arms upon energization of said motor to successively reverse the polarity positions of said switch arms.

2. Apparatus for displaying a portion of an elongated belt according to claim 1 wherein said main switches are manually operable.

3. Apparatus for displaying a portion of an elongated belt according to claim 1 wherein said main switches are each automatically operative in response to a predetermined alarm signal.

4. Apparatus for displaying a portion of an elongated belt according to claim 1 which comprises a pointer connected to said actuator bar for movement therewith, and indicia disposed on said case adjacent the path of said pointer.

References Cited in the file of this patent

UNITED STATES PATENTS

| | | |
|---|---|---|
| 2,482,464 | Chapman | Sept. 20, 1949 |
| 2,729,006 | Olsson | Jan. 3, 1956 |
| 2,754,605 | Berkeley | July 17, 1956 |
| 2,765,552 | Schlafly | Oct. 9, 1956 |